US011105986B2

(12) United States Patent
Coenegracht et al.

(10) Patent No.: US 11,105,986 B2
(45) Date of Patent: Aug. 31, 2021

(54) FERRULE HOUSING WITH INTEGRATED BOOT

(71) Applicant: Commscope Connectivity Belgium BVBA, Kessel-Lo (BE)

(72) Inventors: Philippe Coenegracht, Hasselt (BE); Alexandre Caroline M. De Bie, Beauvechain (BE); Maddy Nadine Frederickx, Aarschot (BE); Paul Joseph Claes, Tremelo (BE); Geert Van Genechten, Vorselaar (BE); Mohamed Aznag, Scherpenheuvel (BE); Diederik Houben, Berbroek (BE); Ponharith Nhep, Savage, MN (US)

(73) Assignee: Commscope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/725,978

(22) Filed: Dec. 23, 2019

(65) Prior Publication Data

US 2020/0132939 A1 Apr. 30, 2020

Related U.S. Application Data

(63) Continuation of application No. 15/760,188, filed as application No. PCT/EP2016/071518 on Sep. 13, 2016, now Pat. No. 10,520,683.

(Continued)

(51) Int. Cl.
*G02B 6/38* (2006.01)

(52) U.S. Cl.
CPC ............ *G02B 6/387* (2013.01); *G02B 6/381* (2013.01); *G02B 6/3821* (2013.01); *G02B 6/3825* (2013.01); *G02B 6/3887* (2013.01)

(58) Field of Classification Search
CPC .................................................. G02B 6/3821
See application file for complete search history.

(56) References Cited

U.S. PATENT DOCUMENTS

| 4,268,115 A | 5/1981 | Siemon et al. |
| 4,676,588 A | 6/1987 | Bowen et al. |

(Continued)

FOREIGN PATENT DOCUMENTS

JP 2011-095493 A 5/2011

OTHER PUBLICATIONS

International Search Report and Written Opinion of the International Searching Authority for corresponding International Patent Application No. PCT/EP2016/071518 dated Feb. 15, 2017, 20 pages.

*Primary Examiner* — Charlie Y Peng
(74) *Attorney, Agent, or Firm* — Merchant & Gould P.C.

(57) ABSTRACT

Aspects and techniques of the present disclosure relate to a fiber optic connector including a connector body defining a central longitudinal axis that extends in a front-to-rear orientation. The connector body can include a front connector housing piece and a rear connector housing piece that may be aligned along the central longitudinal axis. A front end of the rear connector housing piece can be adapted to connect with a rear plug end of the front connector housing piece. The rear end of the rear connector housing piece can include a unitary fiber bend radius limiting structure. The unitary fiber bend radius limiting structure can be generally funnel-shaped. A ferrule assembly can be captured between the front and rear connector housing pieces with the rear connector housing piece functioning as a rear spring stop.

13 Claims, 12 Drawing Sheets

Related U.S. Application Data

(60) Provisional application No. 62/218,244, filed on Sep. 14, 2015, provisional application No. 62/268,067, filed on Dec. 16, 2015, provisional application No. 62/383,090, filed on Sep. 2, 2016.

(56) References Cited

U.S. PATENT DOCUMENTS

| | | | |
|---|---|---|---|
| 5,915,056 A * | 6/1999 | Bradley | G02B 6/3887 |
| | | | 385/76 |
| 8,041,166 B2 | 10/2011 | Kachmar | |
| 9,417,400 B2 * | 8/2016 | Bradley | G02B 6/381 |
| 2004/0017982 A1 | 1/2004 | Nakajima et al. | |
| 2004/0179786 A1 | 9/2004 | Gross, III et al. | |
| 2007/0104445 A1 | 5/2007 | Larson et al. | |
| 2009/0269014 A1 | 10/2009 | Winberg et al. | |
| 2011/0044583 A1 | 2/2011 | Dalton et al. | |
| 2014/0064665 A1 | 3/2014 | Ott et al. | |
| 2014/0153878 A1 | 6/2014 | Mullaney | |
| 2014/0205239 A1 | 7/2014 | Sato | |
| 2014/0254988 A1 | 9/2014 | Nhep et al. | |
| 2017/0341972 A1 | 11/2017 | Bookbinder et al. | |

* cited by examiner

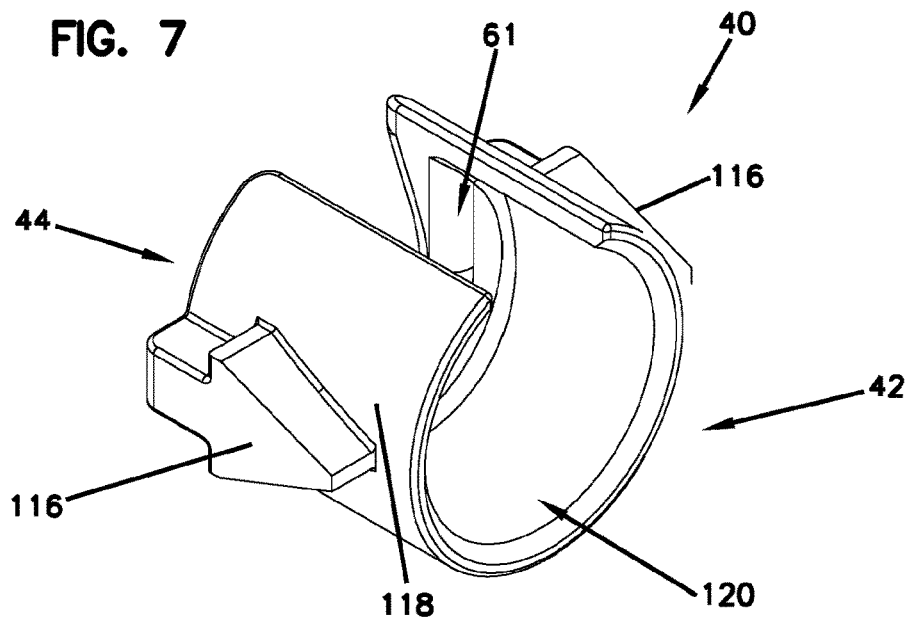
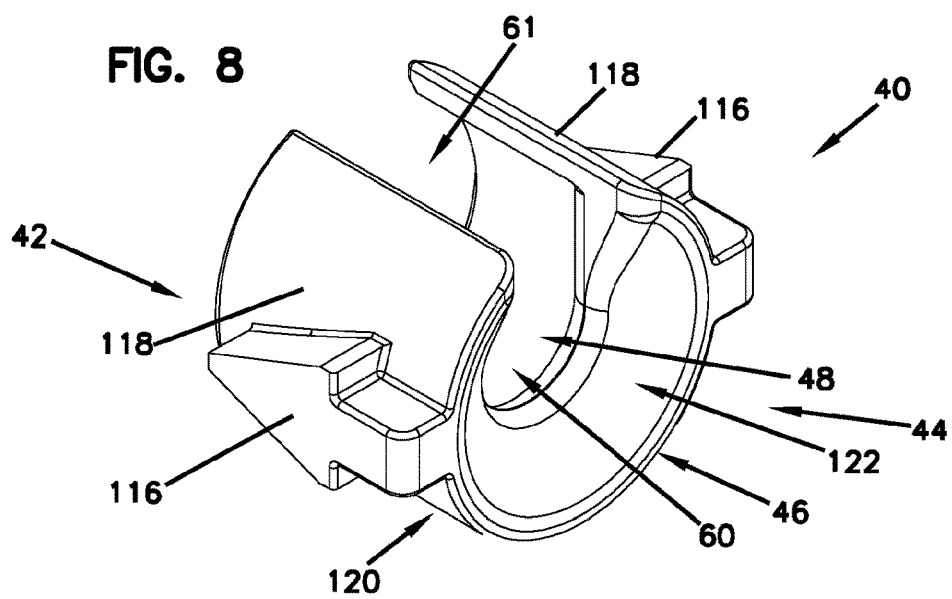
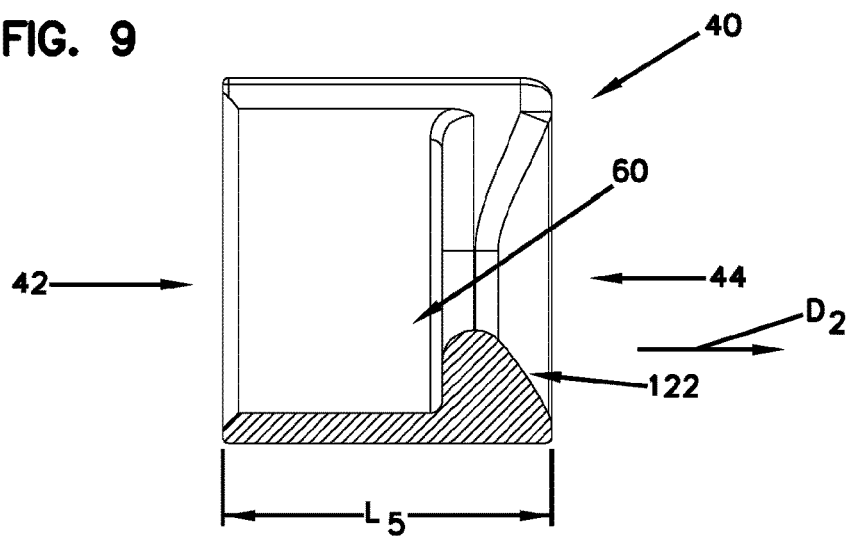

FERRULE HOUSING WITH INTEGRATED BOOT

CROSS-REFERENCE TO RELATED APPLICATIONS

This application is a Continuation of U.S. patent application Ser. No. 15/760,188, filed on Mar. 14, 2018, now U.S. Pat. No. 10,520,683; which is a National Stage Application of PCT/EP2016/071518, filed on Sep. 13, 2016; which claims the benefit of U.S. Patent Application Ser. No. 62/218,244, filed on Sep. 14, 2015; U.S. Patent Application Ser. No. 62/383,090, filed on Sep. 2, 2016; and U.S. Patent Application Ser. No. 62/268,067, filed on Dec. 16, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic connectors can include single fiber connectors and multi-fiber connectors.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength members of the cable to the connector housing of the connector. Anchoring is typically accomplished through the use of conventional techniques such as crimps or adhesive. Anchoring the strength members of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors.

A number of factors are important with respect to the design of a fiber optic connector. One aspect relates to ease of manufacturing and assembly. Another aspect relates to connector cost, durability, and reliability.

SUMMARY

The present disclosure generally relates to a fiber optic connector having features that reduces the overall length of the connector. The present disclosure also relates to a fiber optic connector having features that reduces cost and the number of parts of the connector.

One aspect of the present disclosure relates to a fiber optic connector that can include a connector body assembly that defines a central longitudinal axis that extends between a front end and a rear end of the connector body assembly. The connector body assembly can have a connector body length that extends along the central longitudinal axis between the front and rear ends of the connector body assembly. The connector body assembly can also include a front connector body part including a front with a front end portion and a rear with a rear end portion, the front end portion can define a connector plug. The connector body assembly can further include a rear connector body part that defines a forward end and an opposite rearward end. The rearward end can include a rear portion that defines a fiber opening in alignment with the central longitudinal axis. The rear connector body part can be secured within the rear end portion of the front connector body part. The fiber optic connector can include a ferrule positioned at least partially within the connector body assembly. The ferrule can have a front end and an opposite rear end and a ferrule length that extends along the central longitudinal axis between the front and rear ends of the ferrule. The connector body length may be less than 2.0 times the ferrule length. The fiber optic connector can include a spring for biasing the ferrule in a forward direction. The spring can be retained within the connector body assembly by the rear connector body part.

Another aspect of the present disclosure relates to a fiber optic assembly that can include a fiber optic connector having a connector body assembly defining a central longitudinal axis that extends between a front end and a rear end of the connector body assembly. The connector body assembly can include a front connector body part having a front with a front end portion and a rear with a rear end portion, the front end portion defining a connector plug. The connector body assembly can include a rear connector body part that defines a forward end and an opposite rearward end. The rearward end can include a rear portion defining a fiber opening in alignment with the central longitudinal axis. The rear connector body part can have a rear connector body length that extends along the central longitudinal axis between the forward end and the rearward end of the rear connector body part and the rear connector body part can be secured within the rear end portion of the front connector body part. The fiber optic assembly can include a fiber optic adapter having a first axial end portion defining a first adapter port and a second axial end portion defining a second adapter port. The fiber optic adapter can have an adapter length that extends between the first and second axial end portions. The connector body assembly can be secured in the first adapter port of the fiber optic adapter and the rear connector body length may be less than 1.5 times the adapter port length.

A further aspect of the present disclosure relates to a fiber optic connector that can include a connector body assembly that defines a central longitudinal axis that extends between a front end and a rear end of the connector body assembly. The connector body assembly can have a connector body length that extends along the central longitudinal axis between the front and rear ends of the connector body assembly. The connector body assembly can also include a front connector body part including a front with a front end portion and a rear with a rear end portion, the front end portion can define a connector plug. The connector body assembly can further include a rear connector body part that defines a forward end and an opposite rearward end. The rearward end can include a rear portion that defines a fiber opening in alignment with the central longitudinal axis. The rear connector body part can be secured within the rear end portion of the front connector body part. The fiber optic connector can include a ferrule positioned at least partially within the connector body assembly. The ferrule can have a front end and an opposite rear end and a ferrule length that extends along the central longitudinal axis between the front and rear ends of the ferrule. The connector body length may be less than 2.0 times the ferrule length. The fiber optic connector can include a spring for biasing the ferrule in a forward direction. The spring can be retained within the connector body assembly by the rear connector body part. The fiber optic connector can include a release sleeve mounted over the connector body assembly. The release sleeve can extend from a first end to a second end such that the first end of the release sleeve is positioned nearer the front end of the connector body assembly and the second end of the release sleeve is positioned nearer the rear end of the connector body assembly.

Another aspect of the present disclosure relates to a fiber optic connector having a connector body with integral/unitary fiber bend radius protection.

A further aspect of the present disclosure relates to a fiber optic connector including a connector body defining a central longitudinal axis that extends in a front-to-rear orientation. The connector body includes a front connector housing piece and a rear connector housing piece that are both aligned along the central longitudinal axis. The front connector housing piece includes a front plug end and a rear plug end. The rear connector housing piece includes a front end and a rear end. The front end of the rear connector housing piece is adapted to connect with the rear plug end of the front connector housing piece. The rear end of the rear connector housing piece is configured to receive a fiber optic cable. The rear end of the rear connector housing piece includes a unitary fiber bend radius limiting structure. The unitary fiber bend radius limiting structure is generally funnel-shaped. The unitary fiber bend radius limiting structure flares radially outwardly from the central longitudinal axis along a curved profile as the unitary fiber bend radius limiting structure extends in a rearward direction. The fiber optic connector also including a ferrule assembly that mounts within the connector body. The ferrule assembly includes a ferrule, a ferrule hub mounted to a rear end of the ferrule, and a spring for biasing the ferrule and the ferrule hub in a forward direction. The ferrule assembly is captured between the front and rear connector housing pieces with the rear connector housing piece functioning as a rear spring stop. A front end of the ferrule is accessible at the front plug end of the front connector housing piece.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a front, perspective view of an example rear connector body part in accord with the principles of the present disclosure.

FIG. 8 is a rear, perspective view of the rear connector body part shown in FIG. 7.

FIG. 9 is a cross-sectional view of the rear connector body part shown in FIG. 7.

DETAILED DESCRIPTION

Figure 1:
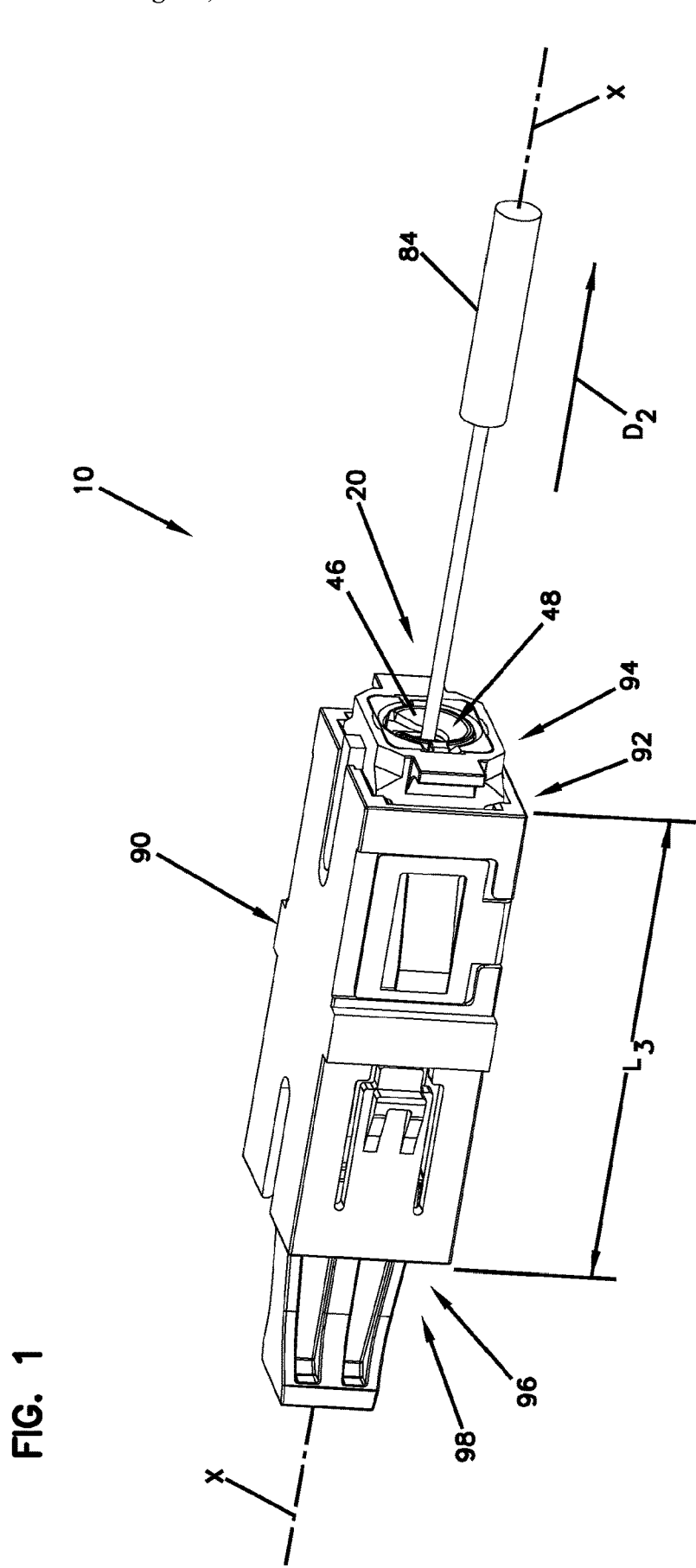
FIG. 1 is a perspective view of a fiber optic assembly in accord with the principles of the present disclosure.
Figure 2:
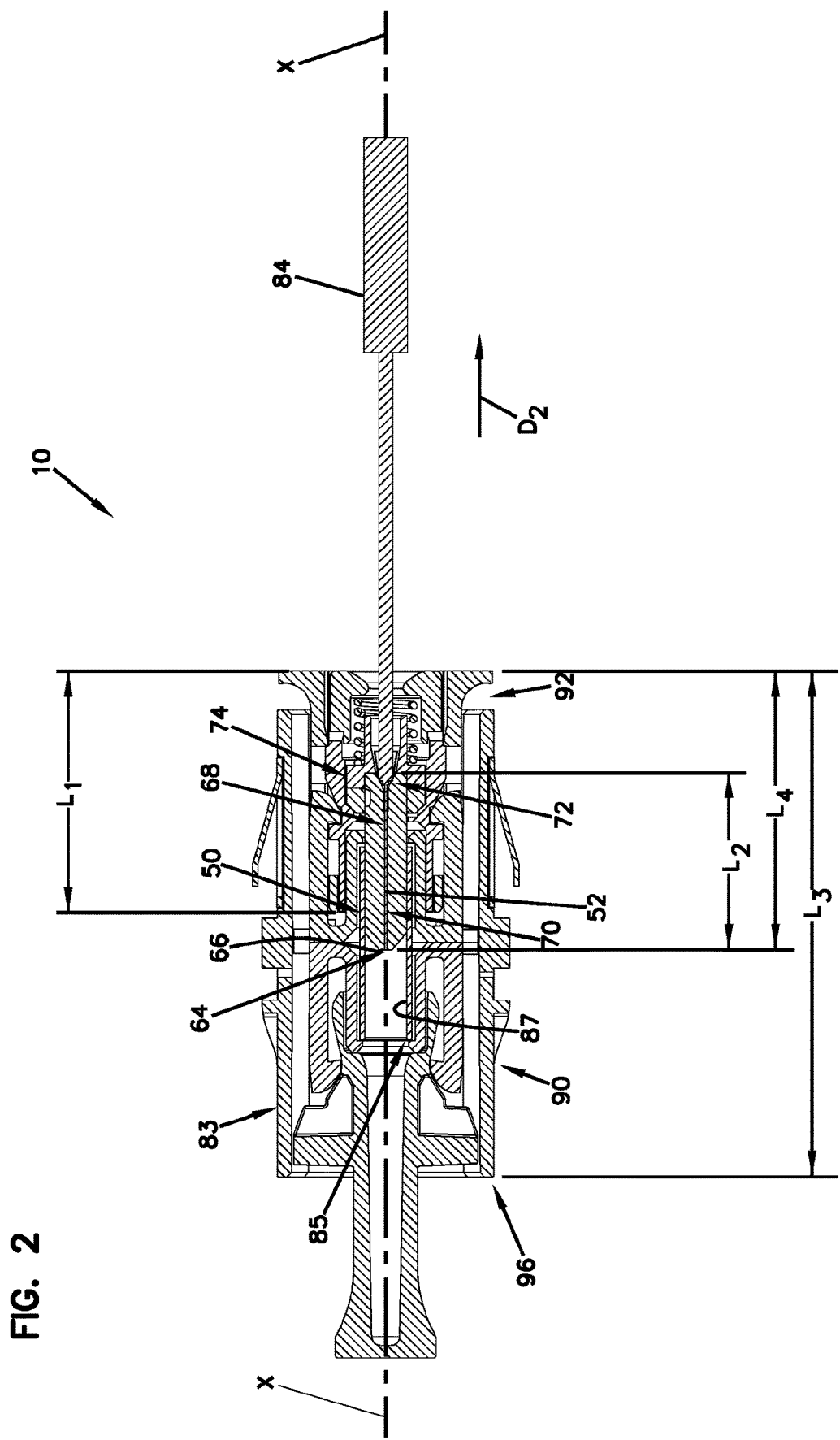
FIG. 2 is a perspective, cross-sectional view of the fiber optic assembly shown in FIG. 1.
Figure 3:
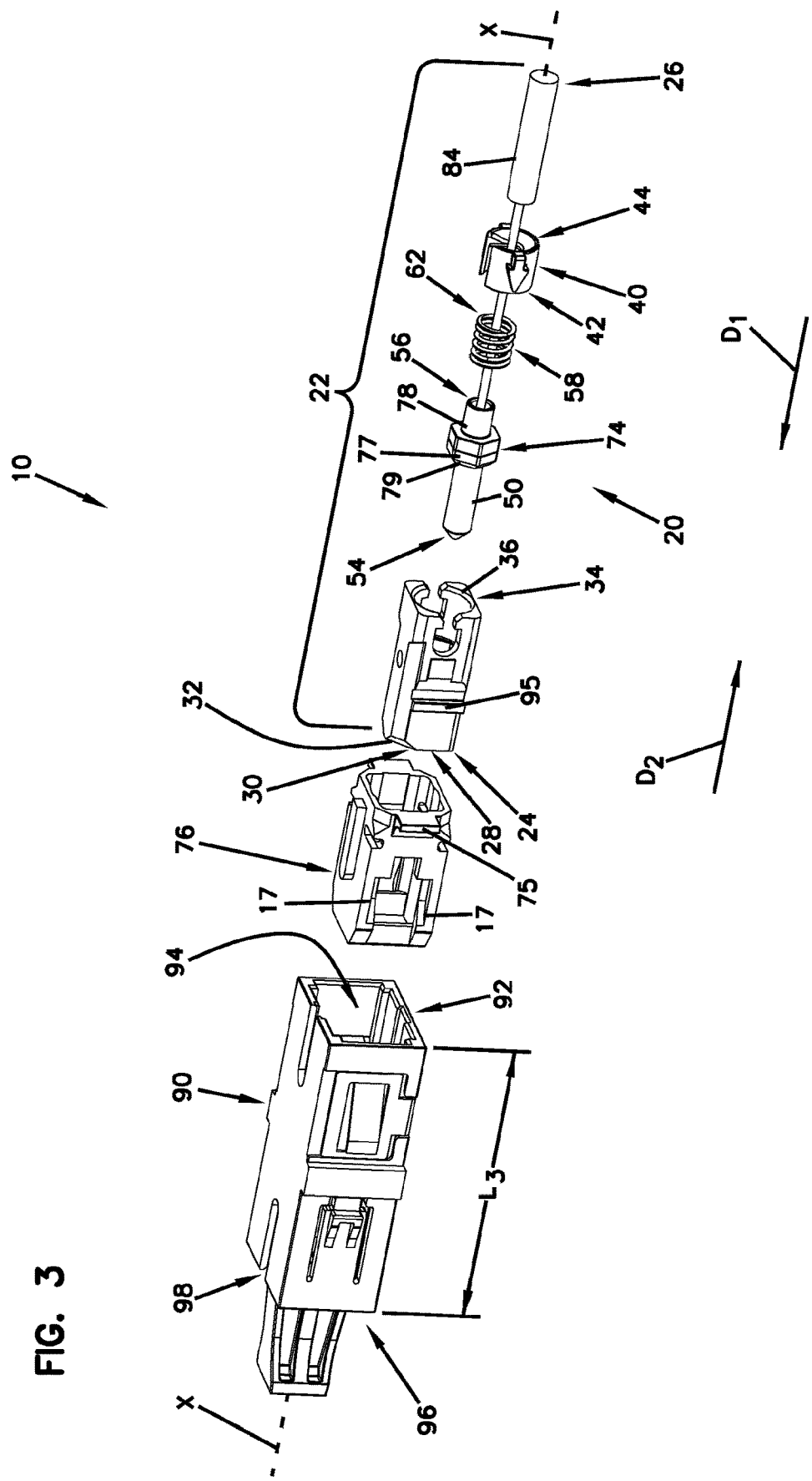
FIG. 3 is a perspective, exploded view of the fiber optic assembly shown in FIG. 1.

FIGS. 1-3 illustrate one example fiber optic assembly 10 which is suitable for practicing aspects of the present disclosure. The fiber optic assembly 10 includes a fiber optic connector 20. The fiber optic connector 20 includes a connector body assembly 22 that defines a central longitudinal axis X that extends between a front end 24 and a rear end 26 of the connector body assembly 22. The connector body assembly 22 has a connector body length $L_1$ that extends along the central longitudinal axis X between the front and rear ends 24, 26 of the connector body assembly 22.

In one example, the connector body assembly 22 includes a front connector body part 28 having a front end 30 with a front end portion 32 and a rear end 34 with a rear end portion 36. The front end portion 32 can define a connector plug 38. The connector body assembly 22 also includes a rear connector body part 40 (e.g., spring retainer) that defines a forward end 42 and an opposite rearward end 44. The rearward end 44 can include a rear portion 46 that defines a fiber opening 48 in alignment with the central longitudinal axis X.

Upon assembly, the rear connector body part 40 can be fully recessed within the front connector body part 28 such that the rear end 26 of the connector body assembly 22 is defined by the rear end 34 of the front connector body part 28 in which case the connector body length $L_1$ is defined by the front connector body part 28. In certain examples, the rearward end 44 of the rear connector body part 40 can be flushed with the rear end 34 of the front connector body part 28 such that the connector body length $L_1$ is defined by the front connector body part 28. It will be appreciated that a portion of the rear connector body part 40 may project outwardly from the rear end 34 of the front connector body part 28 in which case the connector body length would be defined by both the front connector body part 28 and the portion of the rear connector body part 40 that projects.

In one example, at least 75% of the rear connector body part 40 is within the connector body assembly 22. In other examples, at least 70% of the rear connector body part 40 is within the connector body assembly 22. In some examples, at least 80% of the rear connector body part 40 is within the connector body assembly 22. In one example, at least 90% or 100% of the rear connector body part 40 is within the connector body assembly 22. In other examples, the rear end 26 of the connector body assembly 22 can be defined by the rearward end 44 of the rear connector body part 40.

In one example, at least 70% of the rear connector body part 40 axially overlaps with the front connector body part 28. In some examples, at least 80% of the rear connector body part 40 axially overlaps with the front connector body part 28. In other examples, at least 90% of the rear connector body part 40 axially overlaps with the front connector body part 28. In still other examples, 100% of the rear connector body part 40 axially overlaps with the front connector body part 28. The front and rear connector body parts 28, 40 are illustrated and described in more detail with reference to FIGS. 7-9 and 13-15.

The example fiber optic connector 20 includes a ferrule 50 and an optical fiber 52 secured to the ferrule 50. The ferrule 50 can be positioned at least partially within the connector body assembly 22. In one example, the ferrule 50 is generally cylindrical. In one example, the ferrule 50 has a diameter in the range of 1-3 millimeters or in the range of 1.25-2.5 millimeters. Example ferrules include SC ferrules and LC ferrules. The ferrule 50 includes a front end 54 positioned opposite from a rear end 56. The front end 54 of the ferrule 50 includes an end face 64 at which an interface end 66 of the optical fiber 52 is located. The front end 54 of the ferrule 50 is positioned distally outwardly beyond the front end 30 of the front connector body part 28 and the rear end 56 of the ferrule 50 is positioned within the connector body assembly 22.

The ferrule 50 defines a ferrule bore 68 that extends through the ferrule 50 from the front end 54 to the rear end 56. The optical fiber 52 includes a first portion 70 secured within the ferrule bore 68 and a second portion 72 that extends rearwardly from the rear end 56 of the ferrule 50. The first portion 70 of the optical fiber 52 is preferably secured by an adhesive (e.g., epoxy) within the ferrule bore 68 of the ferrule 50. The interface end 66 preferably includes a processed end face accessible at the front end 54 of the ferrule 50. The ferrule 50 includes a ferrule hub 74 mounted to the rear end 56 of the ferrule 50. Upon assembly, the ferrule 50 can be captured between the front and rear connector body parts 28, 40. In one example, the front connector body part 28 and the rear connector body part 40 can be attached together by a snap-fit connection interface to capture the ferrule 50 and the ferrule hub 74 therebetween, alternatives are possible. Generally, the ferrule 50 and ferrule hub 74 are secured together by convenient methods including press fit or adhesive mounts. The fiber optic connector 20 can be one of a variety of well-known connector types, including SC, FC, ST, LX.5, LC, and others.

The ferrule 50 is preferably constructed of a relatively hard material capable of protecting and supporting the first portion 70 of the optical fiber 52. In one embodiment, the ferrule 50 has a ceramic construction. In other embodiments, the ferrule 50 can be made of alternative materials such as Ultem, thermoplastic materials such as Polyphenylene sulfide (PPS), other engineering plastics or various metals. In one example, the ferrule 50 can be a single fiber ferrule such as a ferrule for and SC connector, and ST connector, or an LC connector. While FIGS. 1 and 2 depict a single fiber ferrule, aspects of the present disclosure are also applicable to multi-fiber ferrules such as MT-ferrules and MPO ferrules. A typical multi-fiber ferrule can have a generally rectangular shape and can support a plurality of optical fibers supported in one or more rows by the multi-fiber ferrule.

The ferrule 50 has a ferrule length $L_2$ that extends along the central longitudinal axis X between the front and rear ends 54, 56 of the ferrule 50. In certain examples, the rear connector body part 40 is shorter than the ferrule 50. In one example, the rear connector body part 40 is less than 75% the length $L_2$ of the ferrule 50, alternatives are possible.

In one aspect, the connector body length $L_1$ can be less than 2.0 times the ferrule length $L_2$. In other aspects, the connector body length $L_1$ can be 1.75 times the ferrule length $L_2$. In some aspects, the connector body length $L_1$ can be less than 1.75 times the ferrule length $L_2$. In one example, the connector body length $L_1$ of the connector body assembly 22 is less than 1.5 times the adapter port length $L_4$. In one example, the connector body length $L_1$ is less than 1.25 times the adapter port length $L_4$.

The example fiber optic connector 20 includes a spring 58 for biasing the ferrule 50 and the ferrule hub 74 in a forward direction $D_1$. The spring 58 can be retained within the connector body assembly 22 by the rear connector body part 40. The rear connector body part 40 defines a slot 61 so that the rear connector body part 40 can be loaded or slid on after assembly of the ferrule connector. Thus, rather than the rear connector body part 40 being threaded, can be dropped over the ferrule connector through the slot 61. The rear connector body part 40 defines a receptacle 60 (e.g., pocket) (see FIG. 8) for receiving a rear end 62 of the spring 58. The receptacle 60 acts as a stop that engages the spring 58 such that the spring 58 is compressed.

The ferrule hub 74 includes a front portion 77 and a rear portion 78. The front and rear portions 77, 78 may each have hexagon shapes that are aligned together. The front portion 77 is a hex flange that can includes a series of flats 79 used for indexing or otherwise rotationally positioning the ferrule 50 in the front connector body part 28. The front connector body part 28 and the front portion 77 of the ferrule hub 74 can have mating geometries that allow the ferrule 50 to be mounted at a desired rotatable position. Indicia can be provided on one of the flats 79 so as to indicate a tuned position (e.g., core offset) of the first portion 70 of the optical fiber 52 within the ferrule 50. In this way, the ferrule 50 can be rotationally oriented within the front connector body part 28 taking tuning into consideration. Thus, the hex shape of the ferrule hub 74 and receptacle of the front connector body part 28 allows tuning by allowing core offset to be oriented at a desired position. The front portion 77 can be secured on the ferrule 50 prior to the stripping, cleaning, cleaving, active alignment, and splicing operations. In this way, front portion 77 can be used to facilitate handling of the ferrule 50 during such operations.

Typically in a ferrule, the fiber core is rarely perfectly centered within the ferrule due to manufacturing tolerances. The offset distance between the center of the fiber core and the center of the ferrule is the core offset. To optically connect two connectors, they are inserted into an adapter having an alignment sleeve that receives and co-axially aligns the ferrules. Ideally, the cores of the fibers are co-axially aligned so that light can be transmitted between the fibers. However, due to core offset, the cores may not be co-axially aligned. For example, a worse-case scenario is when the core offsets of connected ferrules are 180 degrees offset from one another.

In certain connectors, the connectors are "tuned" by identifying the direction of core offset, and then assembling the connectors so that the core offsets are always facing in the same direction (e.g., the twelve o'clock position). In this way, when two connectors are mated, the core offsets are aligned and the worse-case scenario of the core offsets being 180 degrees offset from one another will not occur. In an APC (i.e., angle polish connector), the core offset is taken into consideration so that the direction of the core offset is oriented at a predetermined position relative to the direction of the angle polish to provide a tuning function.

Figure 4:
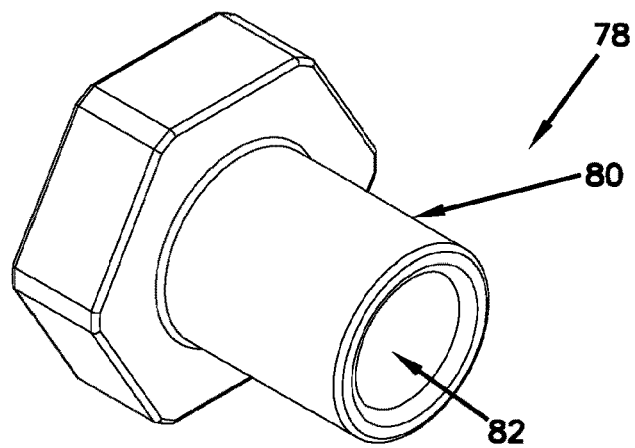
FIG. 4 is a rear, perspective view of a rear portion of an example ferrule hub in accord with the principles of the present disclosure.
Figure 5:
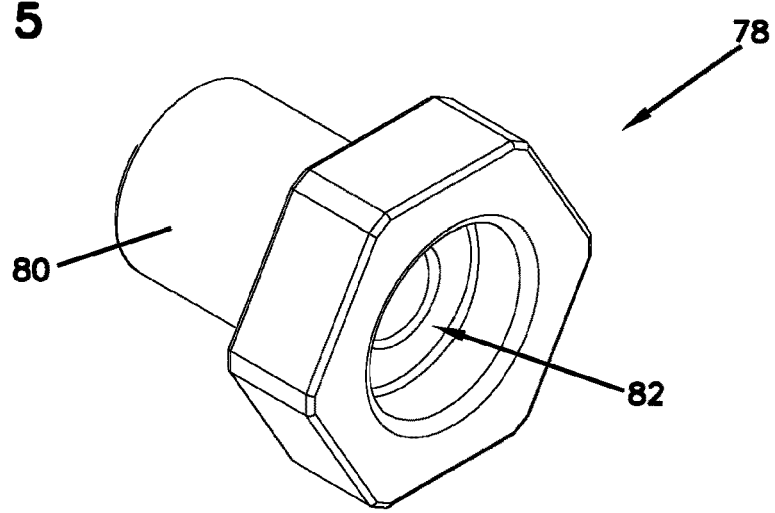
FIG. 5 is a front, perspective view of the ferrule hub shown in FIG. 4.
Figure 6:
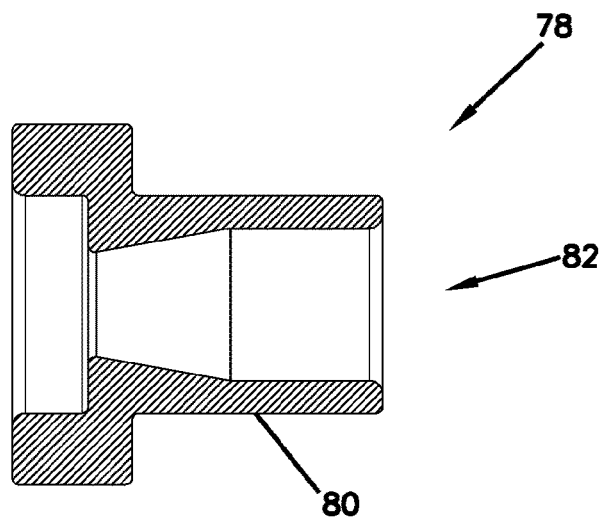
FIG. 6 is a cross-sectional view of the ferrule hub shown in FIG. 4.

Referring now to FIGS. 4-6, the rear portion 78 of the ferrule hub 74 is shown. In this example, the rear portion 78 includes an elongated body 80 defining an internal passage 82 extending along the central longitudinal axis X of the connector body assembly 22.

In one example, the ferrule hub 74 and the ferrule 50 are two separate parts. In other examples, the ferrule hub 74 and the ferrule 50 are formed as a single piece. In other words, the ferrule hub 74 and ferrule 50 are a single, integrally molded piece. The internal passage 82 is sized to receive a terminal end of a fiber optic cable 84, including a portion of the optical fiber 52 and jacket.

In some examples, the optical fiber 52 and/or the jacket can be fixed within the internal passage 82 using various methods, such as by an adhesive. In other examples, one or both of the optical fiber 52 and the jacket are retained within the internal passage 82 by a frictional fit.

In certain examples, the ferrule hub 74 and ferrule 50 is manufactured of a polymeric material using a molding process. In one example, the ferrule hub 74 and ferrule 50 is made of Polyphenylene Sulfide (PPS) using an injection molding process. Other materials and molding processes can be used.

The example fiber optic assembly 10 can include a fiber optic adapter 90 that has a first axial end portion 92 defining a first adapter port 94 and a second axial end portion 96 defining a second adapter port 98. The fiber optic adapter 90 has an adapter length $L_3$ that extends between the first and second axial end portions 92, 96. The connector body assembly 22 is secured in the first adapter port 94 of the fiber optic adapter 90. The first adapter port 94 has an adapter port length $L_4$.

Referring to FIGS. 7-9, the rear connector body part 40 is shown having a rear connector body length $L_5$ that extends along the central longitudinal axis X between the forward and rearward ends 42, 44 of the rear connector body part 40. In one example, the rear connector body length $L_5$ is less than 1.5 times as long as the adapter port length $L_4$. In other examples, the rear connector body length $L_5$ is less than 0.75 times as long as the adapter port length $L_4$.

Figure 10:
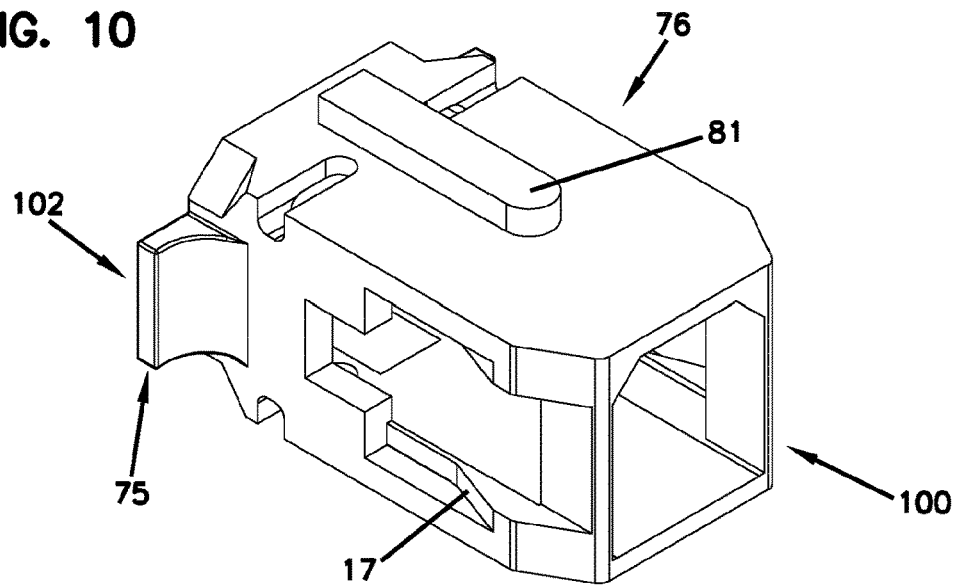
FIG. 10 is a front, perspective view of an example retractable release sleeve in accord with the principles of the present disclosure.
Figure 11:
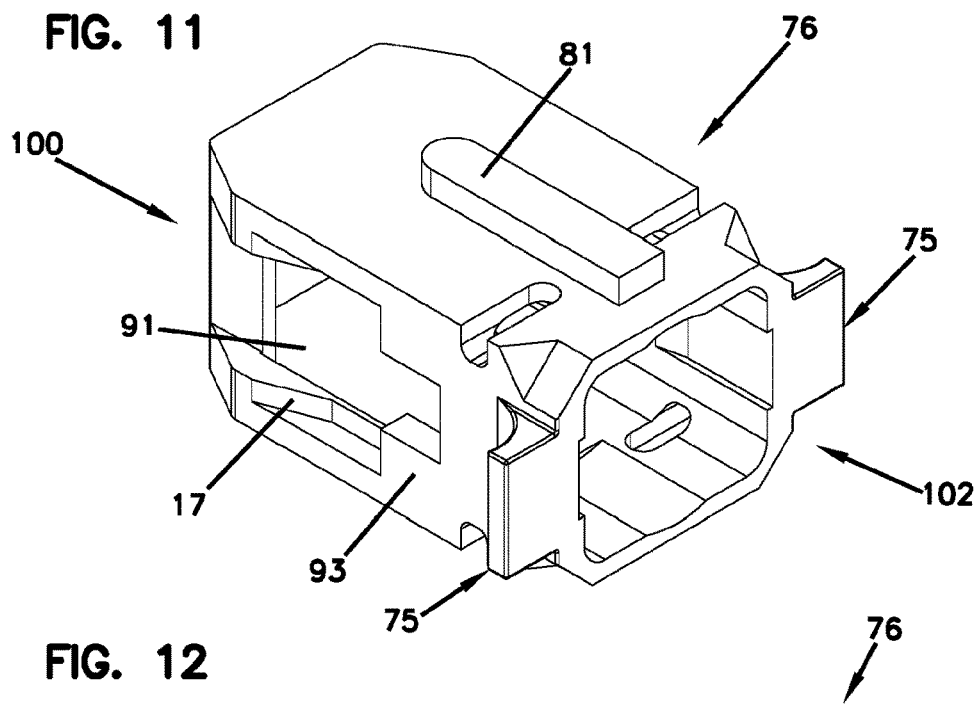
FIG. 11 is a rear, perspective view of the retractable release sleeve shown in FIG. 10.
Figure 12:
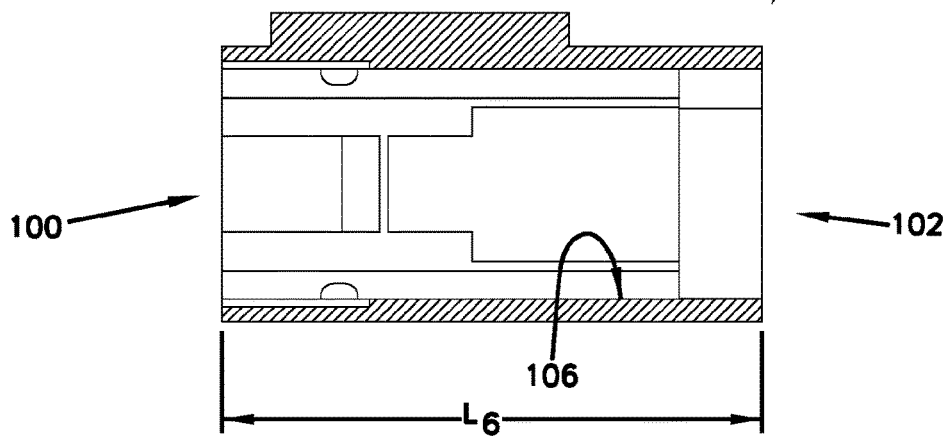
FIG. 12 is a cross-sectional view of the retractable release sleeve shown in FIG. 10.

Referring to FIGS. 10-12, the fiber optic connector 20 may include a retractable release sleeve 76 that mounts over the connector body assembly 22. The retractable release sleeve 76 extends from a first end 100 to a second end 102. The first end 100 of the release sleeve 76 is positioned nearer the front end 24 of the connector body assembly 22. The second end 102 of the retractable release sleeve 76 is positioned nearer the rear end 26 of the connector body assembly 22. The retractable release sleeve 76 is free to slide back-and-forth in distal and proximal directions relative to the connector body assembly 22 along the central longitudinal axis X between a latching position and a release position.

The front connector body part 28 includes a sliding surface 104 (e.g., slide guide) and the retractable release sleeve 76 includes a sliding surface 106 (e.g., slide). The sliding surface 106 of the retractable release sleeve 76 can slidingly engage the sliding surface 104 of the front connector body part 28 between a latching position and a release position. The retractable release sleeve 76 is mounted within the fiber optic adapter 90.

Figure 16:
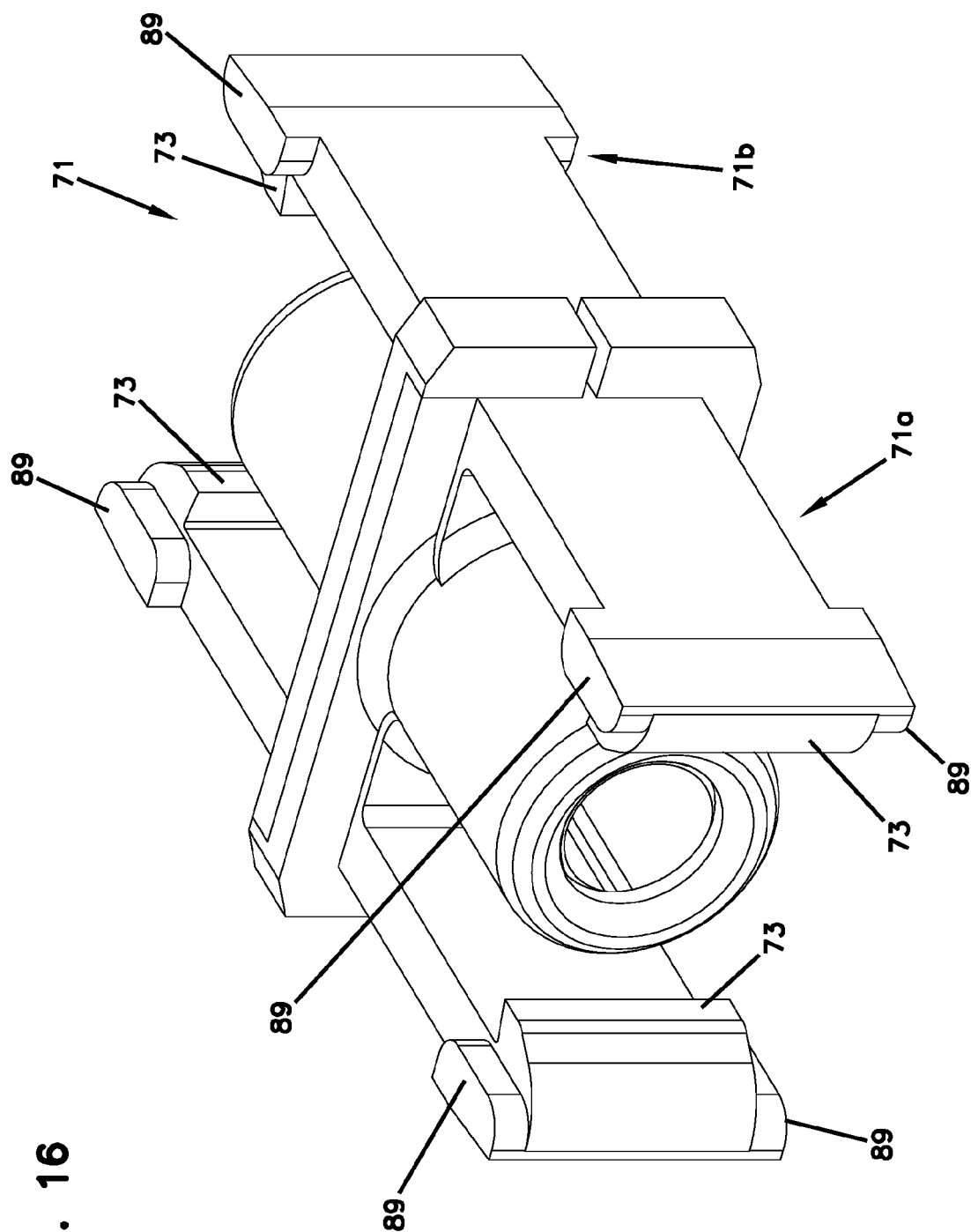
FIG. 16 is a perspective view of a sleeve mount arrangement in accord with the principles of the present disclosure.

The retractable release sleeve 76 can be slid back and forth relative to the connector body assembly 22 through a limited range of movement that extends in a direction along the central longitudinal axis X. The retractable release sleeve 76 includes release ramps 17 that are used to disengage the retractable release sleeve 76 from the fiber optic adapter 90. A sleeve mount arrangement 71 is located within the fiber optic adapter 90. One example sleeve mount arrangement 71 is shown in FIG. 16. The sleeve mount arrangement 1231 includes a first piece 71a and a second piece 71b. In other implementations, however, the sleeve mount arrangement 71 can be formed as a single-piece. Each piece 71a, 71b of the sleeve mount arrangement 71 includes resilient tabs 89 defining latching hooks 73. The latching hooks 73 are configured to cooperate with release ramps 17 of the front connector body part 28 to releasably latch the connector body assembly 22 to the fiber optic adapter 90.

When the connector body assembly 22 is fully inserted into the fiber optic adapter 90 at one of the ports 94, 98, the flexible latching hooks 73 of the sleeve mount arrangement 71 engage the slots 91 defined in the outer portion 93 of the retractable release sleeve 76 to releasably hold connector body assembly 22 at the fiber optic adapter 90. For example, the latching hooks 73 may flex over ridges 95 and snap into the detents 97 of the front connector body part 28. When properly positioned within the fiber optic adapter 90, an optical connection is formed between an optical fiber of a first connector and an optical fiber of a second connector through the abutting contact faces of the ferrules.

When removing one of the fiber optic connectors, the slidable outer portion 93 of the retractable release sleeve 76 is slid axially relative to the front connector body part 28 away from the opposing connector until the flexible latching hooks 73 of the sleeve mount arrangement 71 are released from the slots 91 defined on the outer portion 93 of the retractable release sleeve 76.

The retractable release sleeve 76 includes finger tabs 75 positioned at the second end 102 of the retractable release sleeve 76. The finger tabs 75 can be gripped when it is desired to remove the fiber optic connector 20 from a given one of the ports 94, 98. For example, by pulling back (i.e., in a direction toward the rear end 26 of the connector body assembly 22) on the retractable retention sleeve 76 while the fiber optic connector 20 is mounted in a given port 94, 98, the release ramps 17 force the resilient tabs 89 apart from one another a sufficient distance to disengage the retractable release sleeve 76 from the fiber optic adapter 90. The retractable release sleeve 76 includes a keying rail 81 that fits within keying slots 83 of the fiber optic adapter 90 to ensure proper rotational alignment of the fiber optic connector 20 within the fiber optic adapter 90. When two connectors are latched within the ports 94, 98 of the adapter 90, the ferrules of the connectors fit within respective first and second ends 85 of a split sleeve 87 and are thereby held in co-axial alignment with one another.

The retractable release sleeve 76 is shown having a release sleeve length $L_6$ that extends along the central longitudinal axis X between the first and second ends 100, 102. In one example, the release sleeve length $L_6$ is less than 1.5 times the adapter port length $L_4$. In one example, the release sleeve length $L_6$ is less than 1.25 times the adapter port length $L_4$. In certain embodiments, the release sleeve length $L_6$ is less than 1.5 times the ferrule length $L_2$. In certain embodiments, the release sleeve length $L_6$ is less than 2.0 times the ferrule length $L_2$.

Figure 13:
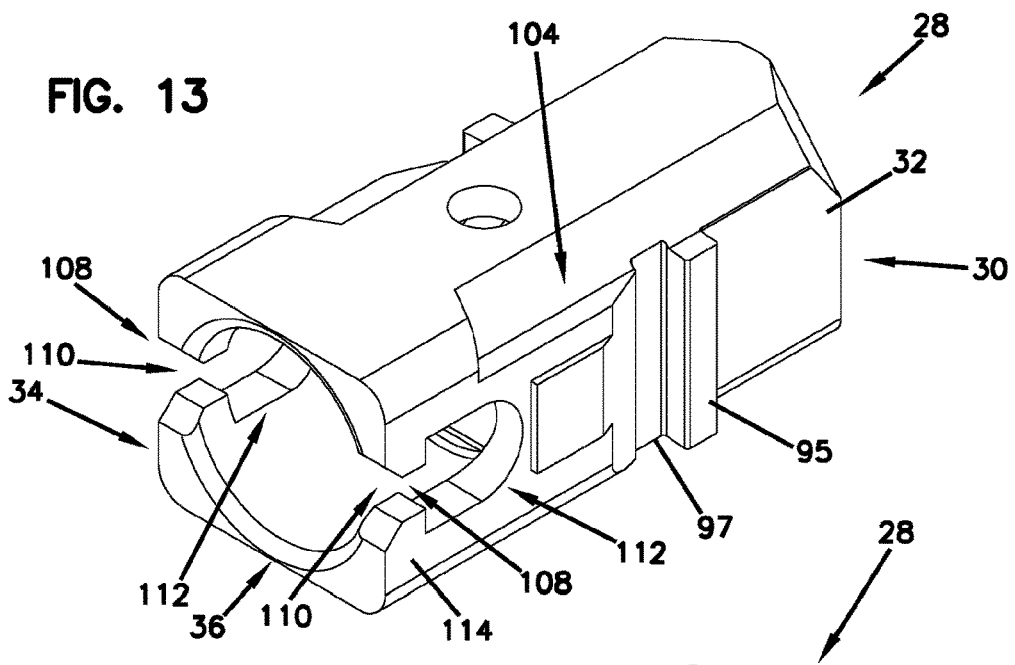
FIG. 13 is a rear, perspective view of an example front connector body part in accordance with the principles of the present disclosure.
Figure 14:
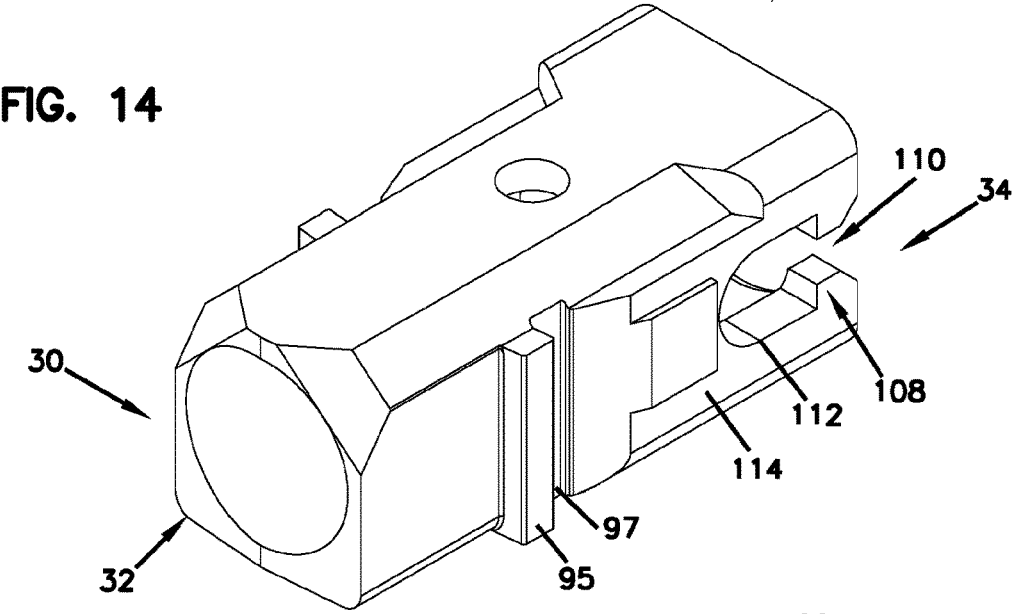
FIG. 14 is a front, perspective view of the front connector body part shown in FIG. 13.
Figure 15:
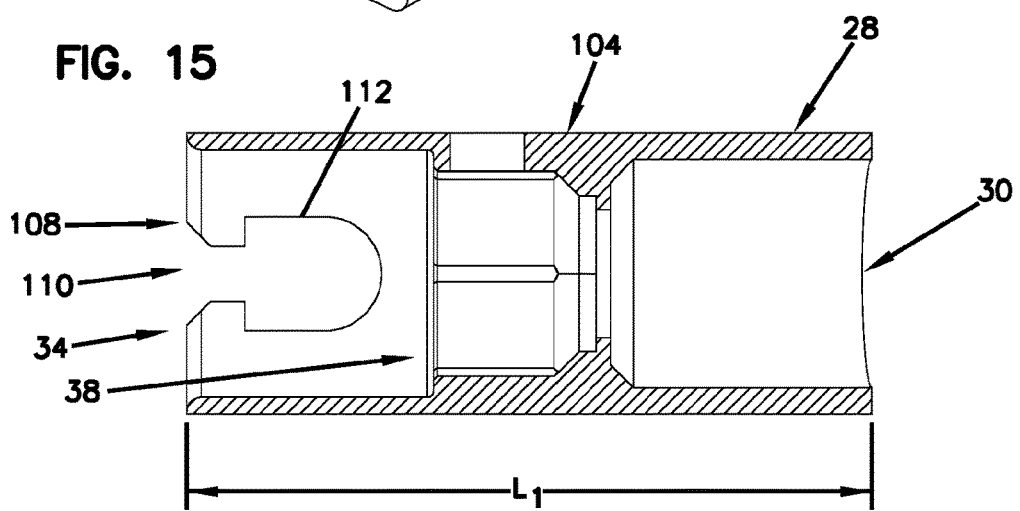
FIG. 15 is a cross-sectional view of the front connector body part shown in FIG. 13.

Referring to FIGS. 13-15, the front connector body part 28 includes a snap fit structure 108 positioned on opposite sides within the front connector body part 28. The front connector body part 28 defines an access slot 110 on opposite side walls 114 thereof. Each one of the access slots 110 includes a retention arrangement 112. Thus, each of the side walls 114 flex open or apart to accommodate the rear connector body part 40 and allow the rear connector body part 40 to snap fit within the front connector body part 28, which can be retained by the retention arrangement 112.

Referring again to FIGS. 7-9, the rear connector body part 40 includes catches 116 (e.g., ribs, projections) positioned on diametrically opposite sides 118 of the rear connector body part 40. The catches 116 project outwardly from a main body 120 of the rear connector body part 40. The snap fit structure 108 is flexible to receive the catches 116 of the rear connector body part 40. The retention arrangement 112 is configured to receive the catches 116 of the rear connector body part 40. In the example depicted, the retention arrangement 112 is shown as an opening that permits the catches 116 to be engaged therein, although alternatives are possible. The catches 116 and the retention arrangement 112 cooperate to define an axial insertion/retention interface between the front and rear connector body parts 28, 40. As the rear connector body part 40 is inserted into the front connector body part 28, the catches 116 pass through the access slots 110 until the catches 116 reach the retention arrangement 112 and are engaged therein.

In one example, the rear connector body part 40 includes a fiber bend radius limiting structure 122 for providing bend radius protection. As such, the fiber bend radius limiting structure 122 can provide the function typically provided by a separate flexible boot. The fiber bend radius limiting structure 122 can be relatively rigid as compared to the flexibility of a standard connector boot. In certain examples, the fiber bend radius limiting structure 122 can aid in relieving the stress that would be imposed on the fiber optic cable 84 as it exits the fiber optic connector 20 without causing the fiber optic cable 84 to kink as it exits, which in most cases would exceed the maximum bend radius of the cable 84 causing damage to the optical fibers 52 therein or causing unacceptable signal loss.

In one example, the fiber bend radius limiting structure 122 is generally funnel-shaped and defines the fiber opening 48 at the rear portion 46 of the rear connector body part 40. The fiber bend radius limiting structure 122 can taper outwardly as the fiber bend radius limiting structure 122 extends in a rearward direction $D_2$. The fiber bend radius limiting structure 122 can have a convex curvature as the fiber bend radius limiting structure 122 extends in the rearward direction $D_2$. In certain examples, at least a portion of the fiber bend radius limiting structure 122 is axially coextensive within a portion of the front connector body part 28.

The fiber bend radius limiting structure 122 can be manufactured by various techniques. Suitable manufacturing techniques include injection molding or co-injection molding where multiple polymers of different moduli and different flexural characteristics can be used. One advantage of the co-injection molding would be that it may produce an extension having varying elastic moduli and flexural characteristics. The fiber bend radius limiting structure 122 may be integral with (e.g., formed in one seamless piece with) or coupled to, the rear connector body part 40, although alternatives are possible.

Figure 17:
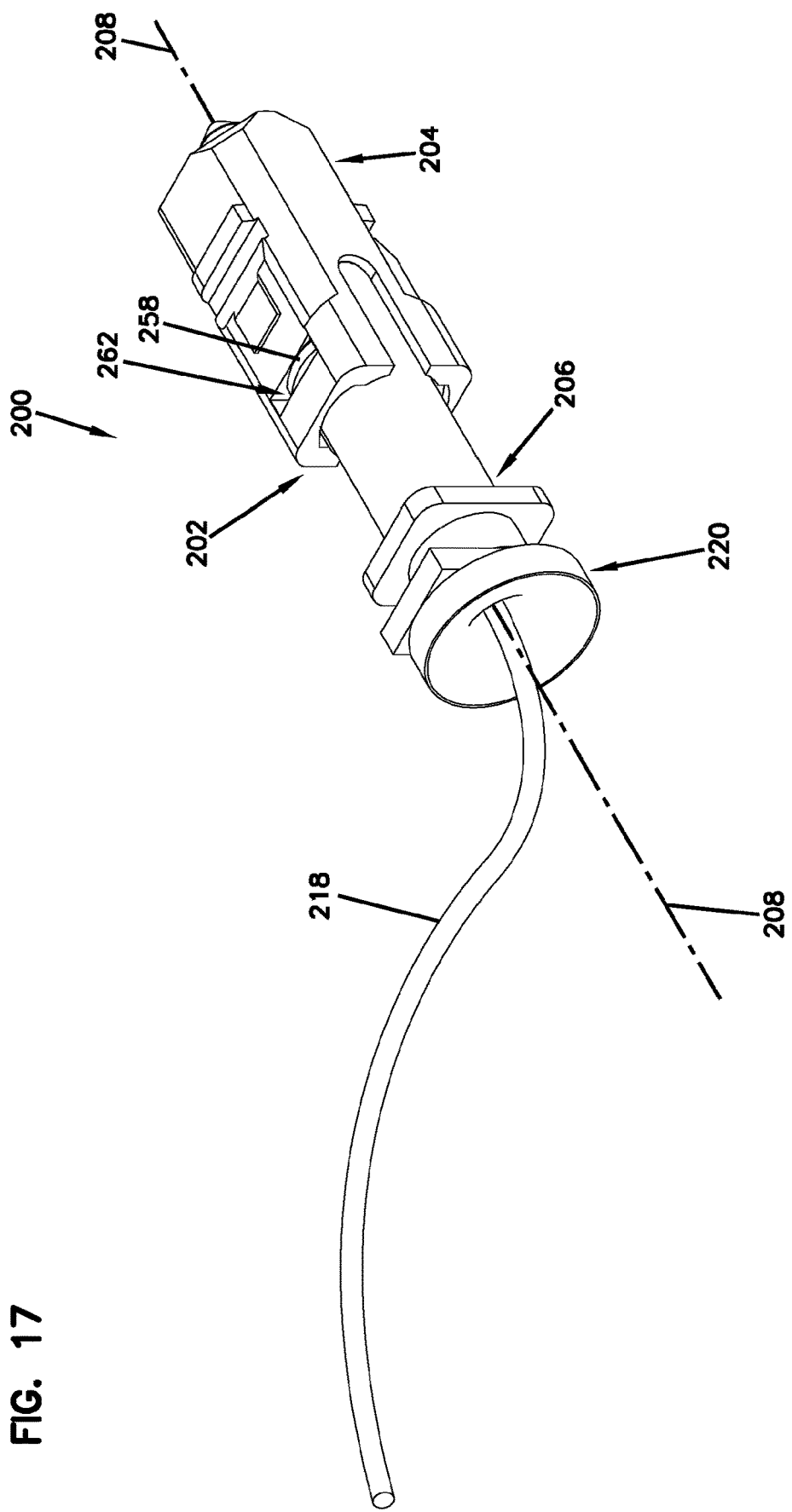
FIG. 17 is a perspective view of a fiber optic connector in accord with the principles of the present disclosure.

FIG. 17 illustrates an example fiber optic connector 200 in accordance with the principles of the present disclosure. The example fiber optic connector 200 shown has a connector body 202 including a front connector housing piece 204 and a rear connector housing piece 206. The connector body 202 defines a central longitudinal axis 208 that extends in a front-to-rear orientation such that the front connector housing piece 204 and the rear connector housing piece 206 are aligned along the central longitudinal axis 208. The connector body 202 can also be referred to as a ferrule housing.

Figure 18:
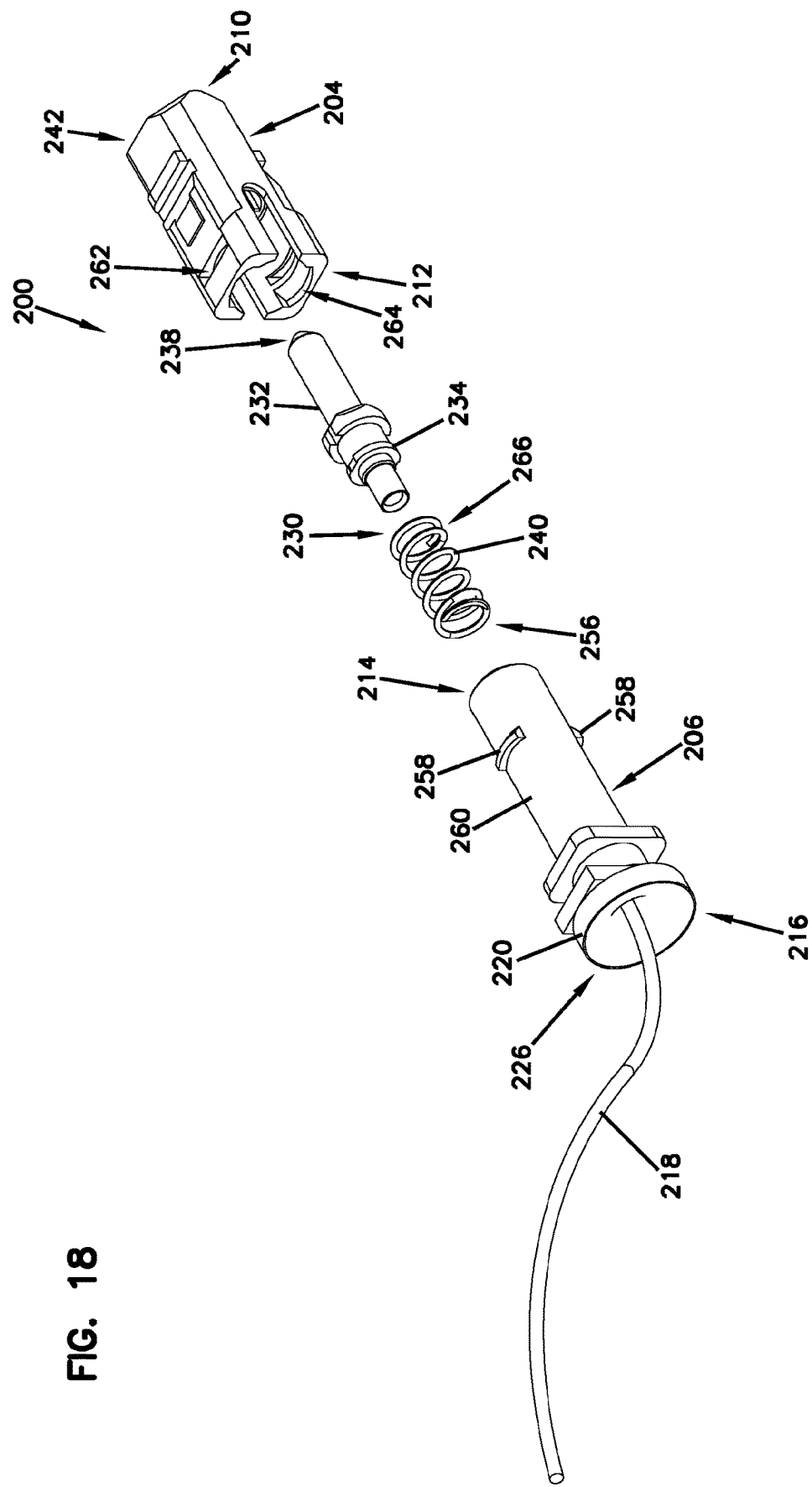
FIG. 18 is a perspective, exploded view of the fiber optic connector shown in FIG. 17.

FIG. 18 illustrates an exploded view of the example fiber optic connector 200. The front connector housing piece 204 of the fiber optic connector 200 includes a front plug end 210 and a rear plug end 212. The rear connector housing piece 206 of the fiber optic connector 200 includes a front end 214 and a rear end 216. In one example, the front end 214 of the rear connector housing piece 206 is adapted to connect with the rear plug end 212 of the front connector housing piece 204. The rear end 216 of the rear connector housing piece 206 can be configured to receive an optical fiber structure 218 (e.g., a coated optical fiber, a buffered optical fiber, or an optical fiber incorporated into a cable).

In one example, the rear connector housing piece 206 includes an example unitary fiber bend radius limiting structure 220. The example unitary fiber bend radius limiting structure 220 may be integral with (e.g., formed in one seamless piece with) or coupled to, the rear connector housing piece 206, although alternatives are possible. In one example, the rear connector housing piece 206 can be a unitary molded plastic part. The unitary fiber bend radius limiting structure 220 can be relatively rigid as compared to the flexibility of a standard connector boot. The example fiber bend radius limiting structure 220 is depicted as having a funnel-shape, although alternatives are possible. The example fiber bend radius limiting structure 220 may be configured to flare radially outwardly from the central longitudinal axis 208 along a non-linear profile 222 (e.g., curved profile) (see FIG. 19) as the example fiber bend radius limiting structure 220 extends in a rearward direction.

The example unitary fiber bend radius limiting structure 220 provides bend radius protection for the optical fiber structure 218. As such, the example unitary fiber bend radius limiting structure 220 of the rear connector housing piece 206 can provide the function typically provided by a separate flexible boot. Thus, the fiber optic connector 200 may not include a protective, flexible boot at the rear end 216 of the rear connector housing piece 206. The optical fiber structure 218 can bend along the non-linear profile 222 or constant radius of curvature, preferably at a radius that does not violate the minimum bend radius of the optical fiber structure 218. Through the use of the example unitary fiber bend radius limiting structure 220, the optical fiber structure 218 can bend at the constant non-linear profile 222 or radius of curvature, desirably at a radius that is greater than the minimum bend radius of the optical fiber structure 218.

In certain examples, the example unitary fiber bend radius limiting structure 220 also aids in relieving the stress that would be imposed on the optical fiber structure 218 as it exits the fiber optic connector 200 without causing the optic fiber structure 218 to kink as it exits, which in most cases would exceed the maximum bend radius of the optical fiber structure causing damage to the optical fiber structure causing unacceptable signal loss.

Although alternatives are possible, the example unitary fiber bend radius limiting structure 220 has a somewhat conical shape with a taper forming portion 224 (see FIG. 19) with inclined (e.g., sloping) sides that taper outwardly. The taper forming portion 224 of the example unitary fiber bend radius limiting structure 220 may gradually decrease in cross-dimension from a first cross-dimension $D_3$ (see FIG. 20) at a proximal end 226 (see FIG. 18) of the connector body 202 to a second cross-dimension $D_4$ (see FIG. 20) at a terminating point 228 (see FIG. 19) thereof.

Typically, the first cross-dimension $D_3$ is at least 0.5 times the second cross-dimension $D_4$. Usually, the first cross-dimension $D_3$ is at least 2.0 times the second cross-dimension $D_4$. Often, the first cross-dimension $D_3$ is no more than 3.0 times the second cross-dimension $D_4$. Of course, alternate ratios of the first cross-dimension $D_3$ to the second cross-dimension $D_4$ of the example unitary fiber bend radius limiting structure 220 are possible in many applications.

Figure 20:
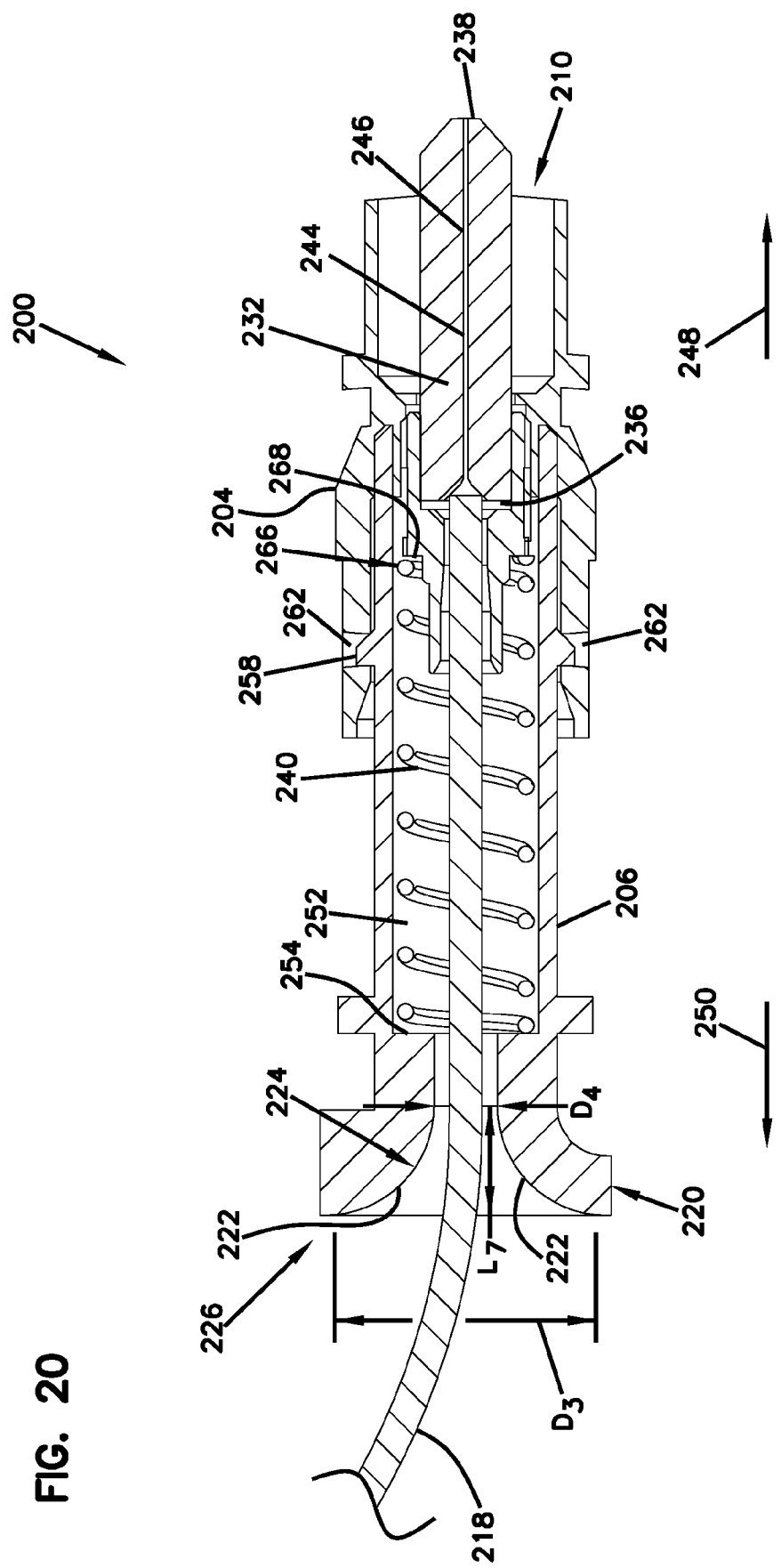
FIG. 20 is a cross-sectional view of the fiber optic connector shown in FIG. 17 showing the rear connector housing piece inserted within the front connector housing piece with a ferrule biased in a forward direction.

Referring to FIG. 20, the example unitary fiber bend radius limiting structure 220 has an axial dimension of extension $L_7$ that is longer than the first cross-dimension $D_3$. In certain examples, the length $L_7$ is longer than the first cross-dimension $D_3$ and shorter than the second cross-dimension $D_4$.

Example materials used for forming the unitary fiber bend radius limiting structure 220 include metal or relatively hard plastic, such as polycarbonate, polyetherimide or polybutylene terephthalate.

The unitary fiber bend radius limiting structure 220 can be manufactured by various techniques. Suitable manufacturing techniques include injection molding or co-injection molding where multiple polymers of different moduli and different flexural characteristics can be used. One advantage of the co-injection molding would be that it may produce an extension having varying elastic moduli and flexural characteristics.

Still referring to FIG. 18, the example fiber optic connector 200 shown includes a ferrule assembly 230 that mounts within the connector body 202. The ferrule assembly 230 includes a ferrule 232. The ferrule assembly 230 includes a ferrule hub 234 mounted to a rear end 236 (see FIG. 19) of the ferrule 232 opposite a front end 238 of the ferrule 232 and a spring 240 for biasing the ferrule 232 and the ferrule hub 234 in a forward direction. The front end 238 of the ferrule 232 is positioned distally outwardly beyond a distal end 242 of the connector body 202 and the rear end 236 of the ferrule 232 is positioned within the connector body 202. Upon assembly, the ferrule assembly 230 is captured between the front connector housing piece 204 and the rear connector housing piece 206 (see FIGS. 19 and 20). In one example, the front connector housing piece 204 and the rear connector housing piece 206 can be attached together by a snap-fit connection interface to capture the ferrule 232 and the ferrule hub 234 therebetween, alternatives are possible. In certain examples, the fiber optic connector 200 may include a release sleeve (not shown) that mounts over the connector body 202.

Figure 19:
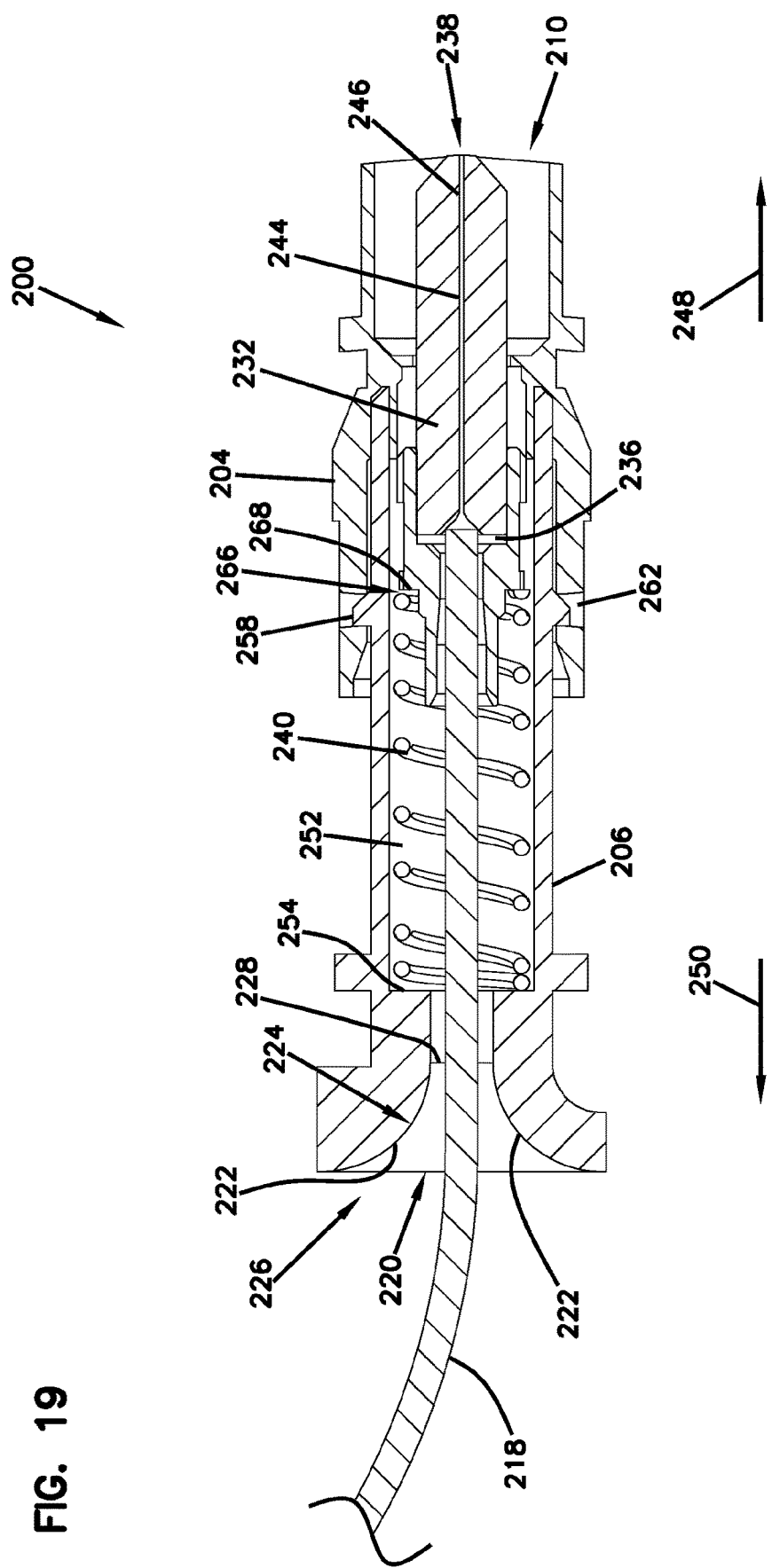
FIG. 19 is a cross-sectional view of the fiber optic connector shown in FIG. 17 showing a rear connector housing piece inserted within a front connector housing piece in accord with the principles of the present disclosure.

Referring to FIGS. 19-20, the proximal end 226 of the connector body 202 with the unitary fiber bend radius limiting structure 220 is configured to receive and provide strain relief/bend radius protection to the optical fiber structure 218. The optical fiber structure 218 includes at least one optical fiber 244. The optical fiber structure 218/optical fiber 244 is routed through an open space in the total length of the fiber optic connector 200. The at least one optical fiber 244 further includes a distal portion 246 (e.g., a bare fiber portion) secured within the ferrule 232. Further details regarding a fiber optic cable are found in U.S. application Ser. No. 12/607,748, filed on Oct. 10, 2009, which is hereby incorporated by reference in its entirety.

As so arranged, the spring 240 is configured to bias the ferrule 232 in a distal direction 248 relative to the connector body 202. Accordingly, the ferrule 232 is movable in a proximal direction 250 relative to the fiber optic connector 200 from a distal (See FIG. 4) position to a proximal position (see FIG. 3). Thus, the proximal movement of the ferrule 232 is against a bias of the spring 240.

Still referring to FIGS. 19-20, the optical fiber structure 218 is shown routed through the fiber optic connector 200 and includes the distal portion 246 secured within the ferrule 232. In one example, the optical fiber 244 can be protected by a coating layer (e.g., acrylate) and one or more additional protective layers (i.e., buffer layers) that can be tight or loose. In some embodiments, the distal portion 246 of the optical fiber 244 extending through the ferrule 232 is bare glass and includes only the core and the cladding layer.

In other examples, the optical fiber structure 218 can include a fiber optic cable including a jacket, protective buffer layers and one or strength members for providing compressive and/or tensile reinforcement to the fiber optic cable.

The rear connector housing piece 206 defines a through-passage 252 that extends through the rear connector housing piece 206 from the rear end 216 to the front end 214. The rear connector housing piece 206 can function as a rear spring stop 254. The rear spring stop 254 can abut against a proximal end 256 (see FIG. 18) of the spring 240 when the rear connector housing piece 206 is installed in the rear plug end 212 of the front connector housing piece 204. In this way, the rear connector housing piece 206 functions to capture/trap the ferrule assembly 230 within the front connector housing piece 206. The front end 238 of the ferrule 232 may be accessible at the front plug end 210 of the front connector housing piece 204.

Turning again to FIG. 18, the front end 214 of the rear connector housing piece 206 includes catches 258 (e.g., ribs, projections) positioned on diametrically opposite sides of the rear connector housing piece 206. The catches 258 project outwardly from a main body 260 of the rear connector housing piece 206. The example front connector housing piece 204 shown defines retention arrangement 262 that can be configured to receive the catches 258 of the rear connector housing piece 206. In the example depicted, the retention arrangement 262 is shown as an opening that permits the catches 258 to be engaged therein, although alternatives are possible.

As shown, the catches 258 of the example rear connector housing piece 206 are arranged and configured to engage the retention arrangement 262 of the example front connector housing piece 204. The catches 258 and the retention arrangement 262 cooperate to define an axial insertion/retention interface between the front connector housing piece 204 and the rear connector housing piece 206. For example, the retention arrangement 262 of the front connector housing piece 204 can help to prevent the rear connector housing piece 206 from being proximally withdrawn therefrom.

To assemble the fiber optic connector 200, the ferrule assembly 230 is initially loaded into the front connector housing piece 204 by inserting the ferrule assembly 230 through the rear plug end 212 of the front connector housing piece 204. The optical fiber 244 of the fiber optic cable 218 can be secured within the ferrule 232 prior to loading the ferrule assembly 230 into the front connector housing piece 204. Also, the spring 240 and the rear connector housing piece 206 can be slid over the fiber optic cable 218 prior to securing the optical fiber 244 in the ferrule 232.

Once the ferrule assembly 230 has been loaded into the front connector housing piece 204, the rear connector housing piece 206 is aligned along the axis 208 and oriented relative to the front connector housing piece 204 such that the catches 258 of the rear connector housing piece 206 align with the retention arrangement 262 of the front connector housing piece 204. The rear connector housing piece 206 is then moved distally along the axis 208 relative to the front connector housing piece 204 such that the front end 214 of the rear connector housing piece 206 is inserted through the rear plug end 212 of the front connector housing piece 204 to be connected together.

Internal clearance is provided between the front connector housing piece 204 and the rear connector housing piece 206 to allow the rear connector housing piece 206 to be inserted without obstruction to the catches 258. For example, as the front end 214 of the rear connector housing piece 206 is inserted into the front connector housing piece 204, the catches 258 pass through gaps 264 and the until the catches 258 reach the retention arrangement 262 and are engaged therein. The rear spring stop 254 engages the spring 240 such that the spring 240 is compressed. A distal end 266 (see FIG. 18) of the spring 240 engages a shoulder 268 (see FIGS. 19 and 20) on the ferrule hub 234 to bias the ferrule 232 in a distal direction.

From the forgoing detailed description, it will be evident that modifications and variations can be made without departing from the spirit and scope of the disclosure.

What is claimed is:

1. A fiber optic connector comprising:
   (a) a connector body defining a central longitudinal axis that extends in a front-to-rear orientation, the connector body including:
      (i) a front connector housing piece including a front plug end and a rear plug end;
      (ii) a rear connector housing piece including a rear housing body having a front end and a rear end, the rear housing body of the rear connector housing piece having an exterior surface that is contoured with a funnel-shaped unitary fiber bend radius limiting structure that flares radially outwardly from the exterior surface of the rear housing body and flares outwardly from the central longitudinal axis along a curved profile as the unitary fiber bend radius limiting structure extends in a rearward direction;
      (iii) the front connector housing piece and the rear connector housing piece being aligned along the central longitudinal axis;
      (iv) the front end of the rear connector housing piece being adapted to connect with the rear plug end of the front connector housing piece; and
      (v) the rear end of the rear connector housing piece being configured to receive a fiber optic cable; and
   (b) a ferrule assembly that mounts within the connector body, the ferrule assembly including:
      (i) a ferrule including a rear end and a front end;
      (ii) a ferrule hub mounted to the rear end of the ferrule;
      (iii) a spring for biasing the ferrule and the ferrule hub in a forward direction;
      (iv) the ferrule assembly being captured between the front and rear connector housing pieces with the rear connector housing piece functioning as a rear spring stop; and
      (v) the front end of the ferrule being accessible at the front plug end of the front connector housing piece.

2. The fiber optic connector of claim 1, wherein:
   (a) the fiber optic connector does not include a protective, flexible boot at the rear end of the rear connector housing piece.

3. The fiber optic connector of claim 1, wherein:
   (a) the front and rear connector housing pieces are secured together by a snap-fit connection interface.

4. The fiber optic connector of claim 1, wherein:
   (a) the rear connector housing piece includes catches positioned on diametrically opposite sides of a main body thereof.

5. The fiber optic connector of claim 4, wherein:
   (a) the front connector housing piece defines a retention arrangement for receiving the catches therein to prevent the rear connector housing piece from being proximally withdrawn from the front connector housing piece.

6. The fiber optic connector of claim 1, wherein:
   (a) the unitary fiber bend radius limiting structure is integral with the rear connector housing piece.

7. The fiber optic connector of claim 1, wherein:
   (a) the unitary fiber bend radius limiting structure has a taper forming portion with inclined sides that taper outwardly.

8. The fiber optic connector of claim 7, wherein:
   (a) the taper forming portion gradually decreases in cross-dimension from a first cross-dimension to a second cross-dimension.

9. The fiber optic connector of claim 8, wherein:
(a) the first cross-dimension is at least 2.0 times the second cross-dimension.
10. The fiber optic connector of claim 8, wherein:
(a) the first cross-dimension is no more than 3.0 times the second cross-dimension.
11. The fiber optic connector of claim 8, wherein:
(a) the unitary fiber bend radius limiting structure has a radial outward dimension of extension that is longer than the first cross-dimension.
12. The fiber optic connector of claim 8, wherein:
(a) the unitary fiber bend radius limiting structure has a radial outward dimension of extension longer than the first cross-dimension and shorter than the second cross-dimension.
13. The fiber optic connector of claim 1, wherein:
(a) the unitary fiber bend radius limiting structure comprises a polymeric material.

\* \* \* \* \*